US011099858B2

(12) United States Patent
Stefan

(10) Patent No.: US 11,099,858 B2
(45) Date of Patent: Aug. 24, 2021

(54) DYNAMICALLY CONFIGURABLE FIELD DEVICE WITH REPOSITORY FOR EXCHANGING DATA BETWEEN FIRMWARE MODULES AND FIELD DEVICES

(71) Applicant: Schneider Electric Industries SAS, Rueil Malmaison (FR)

(72) Inventor: Iulia Dana Stefan, Marktheidenfeld (DE)

(73) Assignee: Schneider Electric Industries SAS, Rueil Malmaison (FR)

( * ) Notice: Subject to any disclaimer, the term of this patent is extended or adjusted under 35 U.S.C. 154(b) by 153 days.

(21) Appl. No.: 16/468,432

(22) PCT Filed: Dec. 14, 2017

(86) PCT No.: PCT/EP2017/082769
§ 371 (c)(1),
(2) Date: Jun. 11, 2019

(87) PCT Pub. No.: WO2018/114571
PCT Pub. Date: Jun. 28, 2018

(65) Prior Publication Data
US 2019/0369584 A1  Dec. 5, 2019

(30) Foreign Application Priority Data
Dec. 20, 2016  (EP) .................................. 16306746

(51) Int. Cl.
*G06F 9/455* (2018.01)
*G06F 9/445* (2018.01)
(Continued)

(52) U.S. Cl.
CPC ..... *G06F 9/44505* (2013.01); *G05B 19/0426* (2013.01); *G05B 2219/25056* (2013.01); *G06F 9/4401* (2013.01)

(58) Field of Classification Search
CPC ...... G05B 19/0426; G05B 2219/25056; G06F 9/4401; G06F 9/44505
(Continued)

(56) References Cited

U.S. PATENT DOCUMENTS 6,275,931 B1 *  8/2001  Narayanaswamy ...... G06F 8/65
711/4
6,850,973 B1 *  2/2005  Larson ............... G05B 19/0426
709/221
(Continued)

FOREIGN PATENT DOCUMENTS

DE  10 2012 112842  6/2016
DE  10 2014 117905  6/2016
EP  2590037  5/2013

OTHER PUBLICATIONS

International Search Report for International Patent Application No. PCT/EP2017/082769, dated Apr. 13, 2018, 5 pages.
(Continued)

*Primary Examiner* — Chun Cao
(74) *Attorney, Agent, or Firm* — Locke Lord LLP

(57) ABSTRACT

A self-adaptive field device is disclosed having a repository, an identity register and a firmware framework having static firmware modules. Further disclosed is an industrial automation system of self-adaptive field devices, and a method for configuring such a system. The method includes booting each field device, evaluating each field device, and initialising each field device. The method may further include resource load balancing.

15 Claims, 12 Drawing Sheets

(51) Int. Cl.
*G05B 19/042* (2006.01)
*G06F 9/4401* (2018.01)

(58) Field of Classification Search
USPC ........................................... 713/1, 2
See application file for complete search history.

(56) References Cited

U.S. PATENT DOCUMENTS

| | | | | |
|---|---|---|---|---|
| 8,745,278 | B2* | 6/2014 | Wallace | G05B 19/042 710/8 |
| 2002/0013629 | A1* | 1/2002 | Nixon | G05B 19/0421 700/4 |
| 2005/0060408 | A1* | 3/2005 | McIntyre | G05B 23/0216 709/225 |
| 2006/0130073 | A1* | 6/2006 | Faist | G06F 9/4411 719/321 |
| 2007/0067767 | A1* | 3/2007 | Da Silva Neto | G05B 19/0426 717/174 |
| 2009/0217023 | A1* | 8/2009 | Griech | G06F 8/65 713/2 |
| 2009/0306796 | A1* | 12/2009 | Budmiger | G05B 19/0423 700/86 |
| 2010/0122245 | A1* | 5/2010 | Igarashi | G05B 19/0426 717/170 |
| 2013/0117612 | A1* | 5/2013 | Isenmann | G06F 11/2284 714/36 |
| 2015/0331400 | A1* | 11/2015 | Birgel | G05B 19/0426 700/86 |

OTHER PUBLICATIONS

PCT Written Opinion of the International Searching Authority for International Patent Application No. PCT/EP2017/082769, dated Apr. 13, 2018, 9 pages.
English Language Machine Translation of European Patent Application Publication No. EP 2590037, dated May 8, 2013, 21 pages.
English Language Machine Translation of German Patent Application Publication No. DE 10 2012 112842, dated Jun. 26, 2014, 17 pages.
English Language Machine Translation of German Patent Application Publication No. DE 10 2014 117905, dated Jun. 9, 2016, 15 pages.

* cited by examiner

DYNAMICALLY CONFIGURABLE FIELD DEVICE WITH REPOSITORY FOR EXCHANGING DATA BETWEEN FIRMWARE MODULES AND FIELD DEVICES

The present invention relates to a self-adaptive field device, an industrial automation system of self-adaptive field devices, and a method for configuring such a system.

BACKGROUND

Industrial control or automation systems are designed using hardware and software components for the purpose of automated monitoring and controlling of industrial machinery executing an automated industrial process. Such an Industrial Control System 1, for example as shown in FIG. 1, generally has as at least one Programmable Logic Controller (PLC) 2, 3, one or more clients 4 and multiple field devices 5, 6, 7 all connected through a Communication Network 8.

Industrial automation systems are provided to perform, control and supervise industrial processes, all in real-time. Industrial processes are implemented through the use of multiple machines that perform automated tasks and functions. The ensemble of tasks and functions is determined by the specific machine application. The design and organisation of the control system for the specific machine application may be done through an engineering tool. This tool allows assessing and configuring all the components and field devices of the machine and determines machine application requirements for each of these. Any field device employed in the system needs to be adapted to and configured for the machine application, which is constituted by the hardware and software used in the system.

For example, a slicing and wrapping machine may consist of a conveyor, a slicing knife and a wrapping station. The machine is build up modular and may be used for processing and packaging different goods: cheese, sausage, bacon. Each of these machine parts is equipped with one or more field devices to control the operation of the machine part. For example, the conveyor is equipped with a drive and sensors. Each may require certain calculations or processing operations, as e.g. needed for speed, tracking time, counting or various other parameters. And for each part of the machine, different functionalities are required. For example, for the conveyor it may be necessary to only have a velocity operating mode with a low resolution incremental encoder. Whereas for the slicing knife it may be necessary to have both a positioning control mode and torque control mode with adjustable motion control parameters and a high resolution EnDat encoder.

Hence, an automation system includes different pieces of automation equipment to enable control and supervision. Such devices include, for example, programmable logic controllers (PLC) for control and data acquisition and Human machine interfaces to allow operators to access and control the process. Further included are field devices such as sensors, actuators, power supplies, drives, I/O modules, or drives with PLCs inside to execute commands and feed back the operating conditions of a machine.

The above mentioned field devices may comprise one or more processing units, registers and memory all in varying levels of performance. Depending on processing power, storage capacity and speed, a field device may be optimized for a specific task or function. In order to perform its' designed task a field device is equipped with a ROM or other solid state memory that is loaded with firmware. This firmware determines what task or function the field device will perform. As these field devices commonly have high time critical constraints and relative low computation resources, the firmware is optimized for a specific task within the functional configuration of the machine application. Once the firmware is loaded on the field device, it is very inflexible with regard to changes to or replacements of field devices or components.

One trend is to make field devices as smart as possible, embedding them with more and more capabilities. This has a negative impact both on costs and on performance, as the field device needs to support not only its' main function, but also other services and functionalities. Some of these functionalities may be stored on higher level devices, resulting in a rigid coupling between the field devices and the higher level devices. All in all, this further raises the burden of optimization while aiming to take full advantage of all the capabilities.

Another trend is that users of these industrial automation systems desire to change their system more regularly to adapt to changing demands in the market or to regulatory requirements. The above mentioned inflexibility of industrial automation systems hampers implementing such changes quickly and efficiently.

SUMMARY OF INVENTION

It is an object of the invention to alleviate the disadvantages of inflexibility of the field devices, and in particular the firmware embedded in these field devices.

In one aspect, the invention provides a field device having a repository, an identity register, and a framework including static firmware modules. This facilitates a field device to construct its' firmware in a flexible manner. Furthermore, it allows a field device to adapt its' firmware by itself, when required by e.g. an update.

In one aspect, the invention also provides a method for configuring multiple field devices of the type disclosed herein. The method includes providing at least two field devices each having repository, identity register, and framework including static firmware modules. The method further includes booting each field device, evaluating each field device, and initialising each field device. The booting is done from the static firmware modules, and more precisely based on the code present therein. The evaluating is done for assessing which additional firmware modules are required. And initialising is done to set up the field device based on both the static and additional dynamic firmware modules when loaded.

The concept of a framework is known from computer science wherein various components may be used to build an application specific program. A framework may include functional modules such as communication protocols, standards for code and data, and it may include libraries. Examples of well-known frameworks are for example the .NET framework or DirectX from Microsoft Corporation, and VxWorks from Wind River is a particular example for embedded devices. In order to execute, a framework may include a kernel of an operating system and functionality for loading and unloading additional function modules. Additional functional modules may expand or replace functionality of the framework. The loading/unloading functionality may be part of the operating system. Additional pre-compiled functional modules may be loaded directly, as the framework provides the interface for the additional functional modules with the already present functional modules by means of the standards for communicating and exchanging code and data that are part of the framework. This ability of loading and unloading unhindered by compiling requirements is in this disclosure referred to as a dynamic loading of firmware modules. And the functional firmware modules that may be loaded in that manner are referred to as dynamic firmware modules. Correspondingly, functional firmware modules forming part of the framework or the operating system prior to loading/unloading additional firmware modules are referred to as static firmware modules.

With one monolith firmware the requirements for the hardware resources are high: both from computational as memory point of view. Using the self-adaptive framework, only the required functionality is dynamically loaded during the initialization of the machine. Referring to the slicing and wrapping machine example above, if in the future other goods have to be packed with the same machine, the operator or user does not have to take care of adapting the connected field devices. The system, viz. the field devices, control and operation devices, will detect automatically if the updated machine application can be fulfilled and how. The user does not have to re-design and figure out whether this may be executed by the machine.

In this disclosure, a machine application refers to the configuration an operator may set up for an industrial control process of industrial machinery through e.g. an automation portal. The complete assembly of hardware and software employed for the machine application will be referred to as a machine environment. For example, the whole assembly of the engineering tool used to design the machine application, applicable communication protocols, encoding protocols and various peripheral devices may be referred to as the machine environment.

BRIEF DESCRIPTION OF THE DRAWINGS

By way of example only, the embodiments of the present disclosure will be described with reference to the accompanying drawing, wherein.

DETAILED DESCRIPTION

Figure 2:
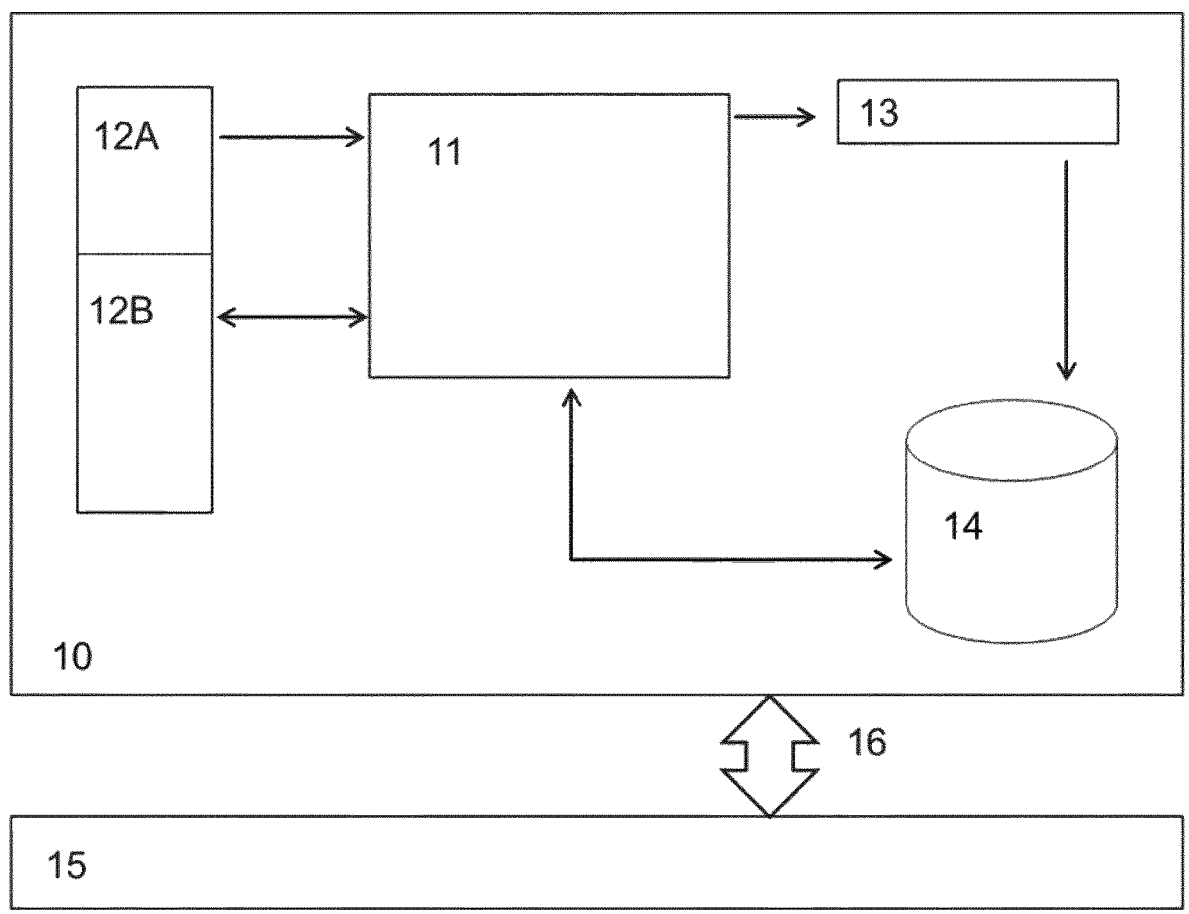
FIG. 2 schematically illustrates an example of a field device in accordance with the invention.

FIG. 2 schematically shows a field device 10 having a processing unit 11, a framework 12A-B, an identity register 13 and a repository 14. In this example, the framework is implemented as a memory unit that holds a number of static firmware modules 12A for connecting the field device to a machine environment, loading or unloading additional dynamic firmware modules 12B, configuring the additional dynamic firmware modules, and registering the firmware modules with the identity register 13. Hence, the framework 12A-B includes a set of static firmware modules 12A at booting i.e. start up and may be expanded by including a set of dynamic firmware modules 12B when initialising, as explained further below. Both static and dynamic firmware modules 12A-B contain instructions that may be executed by the processing unit 11. Further examples of functionality provided by static firmware modules include a real-time kernel, a supervisor, a motion generator, and/or motion control. In the example of FIG. 2, the memory unit holding the static firmware modules is referred to as a framework. However, the collection of static firmware modules itself may also referred to as a framework. As it is not the particular implementation in hardware, software or firmware, but the functionality provided that is of relevance. Hence, the framework being able to expand the collection of static firmware modules with dynamic firmware modules and provide coordinated execution of a device application.

The repository 14 is an embedded database that may be accessed by the firmware modules loaded by the framework for reading and writing information for exchange with other firmware modules. The repository 14 may also be accessed by the identity register 13 for reading and writing information that describes the internal configuration of the field device 10. In addition, the repository 14 may be accessed by other field devices and/or peripherals for reading and writing data. Hence, the repository 14 enables the exchange of data between the various firmware modules and with different field devices. The data may include the detailed description of parameters, configuration and functionalities of the field device 10.

The identity register 13 is a memory unit that is used to maintain a description of the available firmware modules, both static and dynamic, parameters and configuration of the field device. The identity register 13 may further list the available hardware; this may include the type of hardware, version number, resources, connected hardware, I/O options, and compatible firmware modules. The identity register 13 may further include the firmware version, available function modules that can be executed with the given hardware. For example, for a particular Encoder hardware component, three different firmware modules may be available: a bi-directional EnDat module, an incremental module, and an absolute module. Which firmware module is required and subsequently loaded may be decided when the connected physical encoder is actually identified.

Though in the example of FIG. 2 the identity register 13 maintaining the description of the device is implemented as a memory unit, it may also be implemented in another way such as a cache in the processing unit 11 or other means of storage. As it is not the particular implementation in hardware, software or firmware, but the provided functionality that is of relevance; which is maintaining a description of the device that may be made available to other devices.

The identity register 13 creates an identity container during an initialization phase. The identity container contains an overview of the available firmware modules and their costs of execution. The identity container may be forwarded to a field device that requests support. Thus, the identity container provides a configuration overview of the field device.

Figure 1:
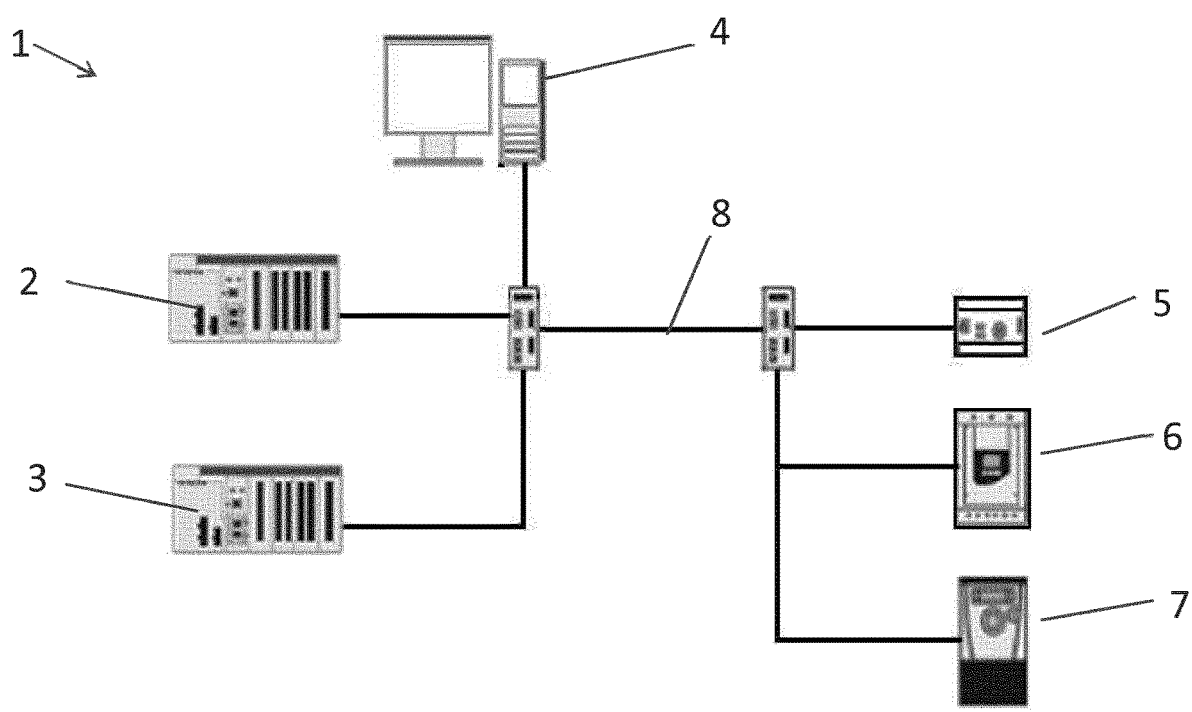
FIG. 1 illustrates schematically an example of an industrial automation system.

The field device 10 is connected to at least one communication network 15 or field bus of an industrial control system, such as for example shown in FIG. 1, via a communication interface 16. The communication interface 16 allows for example exchange of data and control signals with peripheral components, such as sensors and actuators, and with higher control levels of the machine application.

Figure 3:
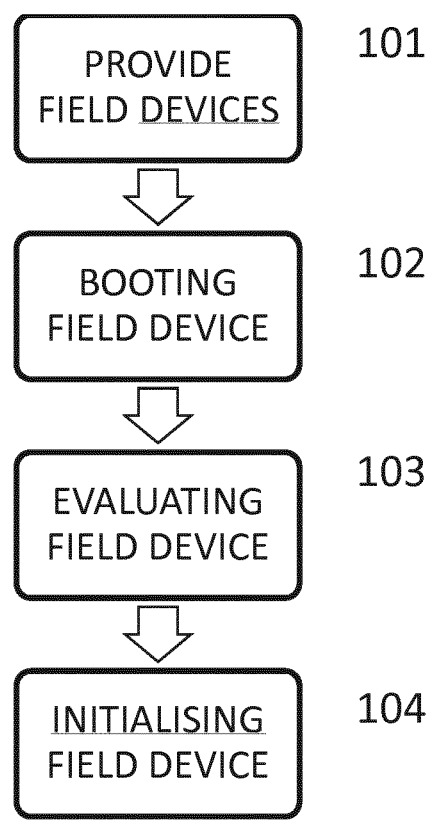
FIG. 3 illustrates an example of a method for configuring a field device in accordance with the invention.

Referring to FIG. 3, a method is shown for configuring multiple field devices of the type as described in reference to FIG. 2. The method includes providing at least two field devices 101 each having a repository, an identity register, and a framework including static firmware modules. The method further includes booting 102 each field device, evaluating 103 each field device, and initialising 104 each field device.

Figure 4:
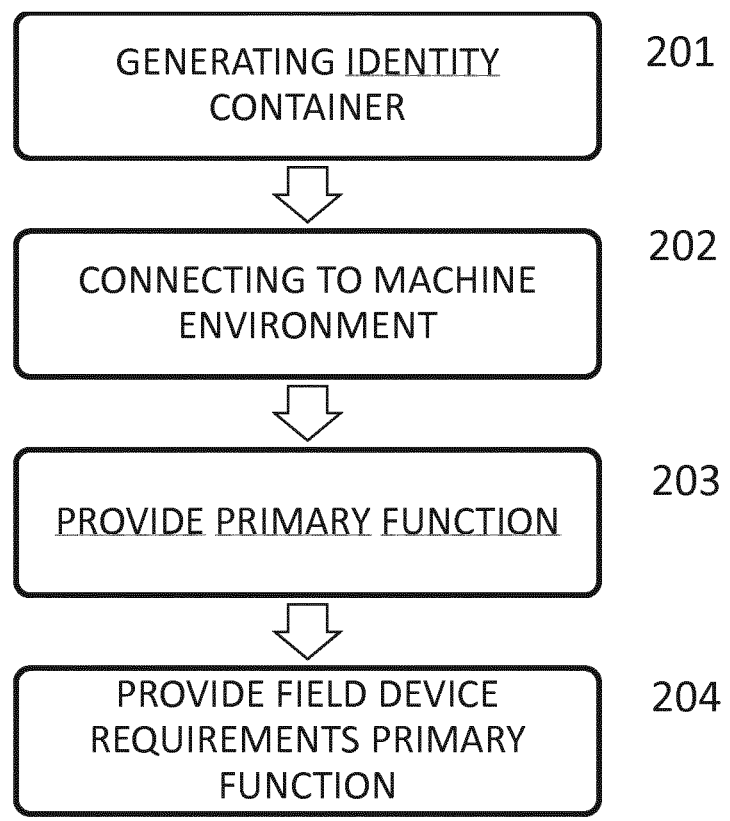
FIG. 4 illustrates an example of a method for booting a field device in accordance with the invention.

Referring to FIG. 4, the booting 102 of each field device includes for each field device: generating an identity container 201, connecting to a machine environment 202, providing at least one predetermined primary function 203 to the field device, and providing field device requirements 204 for the at least one primary function. The identity register holds the information of which static firmware modules are present. Generating 202 the identity container includes assessing which firmware modules are registered with the identity register. The identity container may be generated in the repository to allow exchange of the identity container with other field devices. The identity register creating the identity container may include information present in the repository. The generation of the identity container facilitates a self-identification of the field device.

As the field devices will be part of an automation control system, these need to be connected 202 to the machine environment constituted by the hardware and software used or intended for use. For example, the engineering tool used to design the machine application, applicable communication protocols, encoding protocols and various peripheral devices.

By means of the engineering tool at least one primary function for each of the at least two field devices will be predetermined and is provided 203 to each field device respectively. Together with the primary function, the field device requirements for the at least one primary function will be provided 204 to the respective field device.

Figure 5:
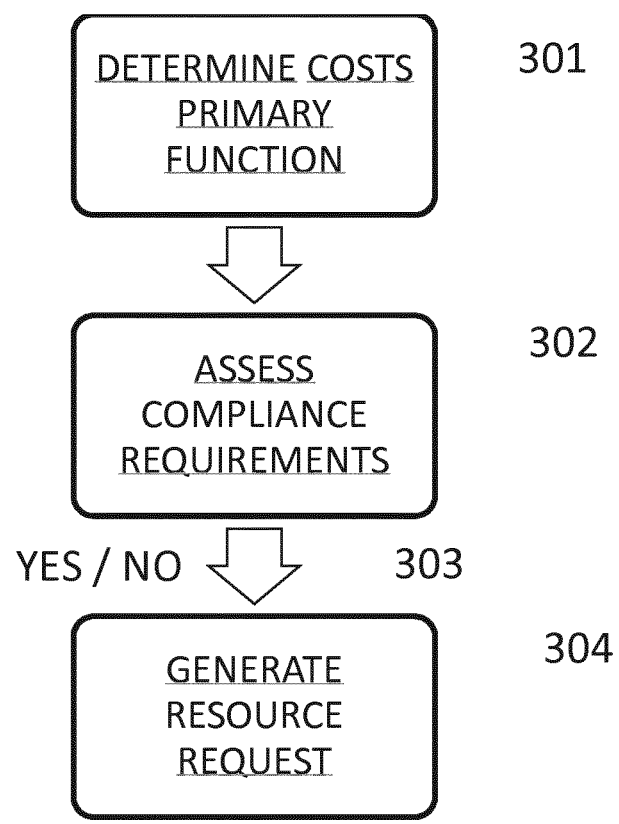
FIG. 5 illustrates an example of a method for evaluating a field device in accordance with the invention.

Referring to FIG. 5, the evaluating 103 of each field device includes, for each respective field device, determining 301 cost of execution of the at least one primary function of the field device, assessing 302 whether the cost of execution complies with the field device requirements for the at least one primary function of the field device, and generating 304 a resource request if the costs of the at least one primary function do not comply 303 with the field device requirements.

Determining 301 the cost of execution of the primary function of the field device may include assessment of the cycle time required for the primary function. It may also include calculating the amount of working memory involved or occupied. Other parameters that may be assessed are priority level, maximal delay, module load, resource load.

With the cost of execution determined, it may be assessed 302 whether the field device is capable of compliance with the requirements set for the field device. If so, the field device may be able to execute additional functions or partial functions by performing subroutines of primary functions executed by another field device. If the field device is not capable of meeting the application requirements, so if the costs of the primary function do not comply 303 with the field device requirements set, for example by the engineering tool, the field device may generate 304 a resource request.

The resource request indicates the lack of capability and/or capacity of the particular field device to execute its primary function. In more detail, the resource request may indicate which function or subroutine it requires as support from another field device. Hence, in order to perform its primary function, the field device may also delegate execution of functions or subroutines as secondary functions to another field device.

Figure 6:
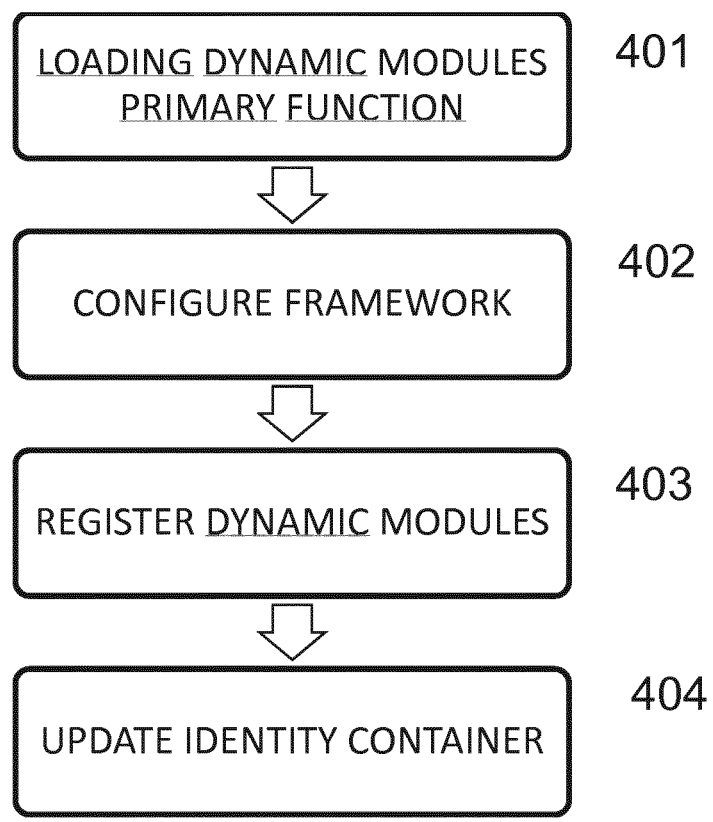
FIG. 6 illustrates an example of a method for initialising a field device in accordance with the invention.

Turning, to FIG. 6, initialising 104 each field device includes loading 401 dynamical firmware modules to the framework required for the at least one primary function, configuring 402 the framework according to the field device requirements, registering 403 the dynamic firmware modules with the identity register, and updating 404 the identity container in the repository.

Figure 7:
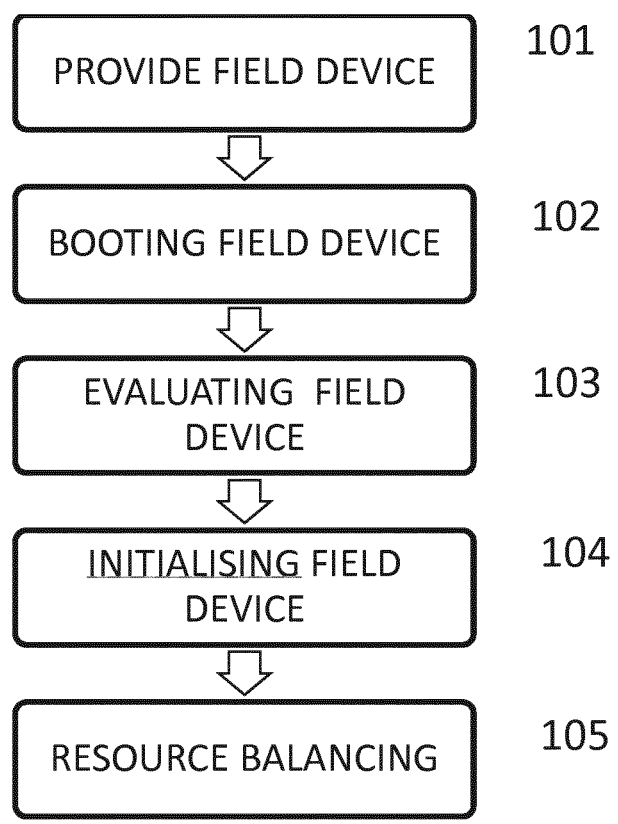
FIG. 7 illustrates another example of a method for configuring a field device in accordance with the invention.
Figure 8:
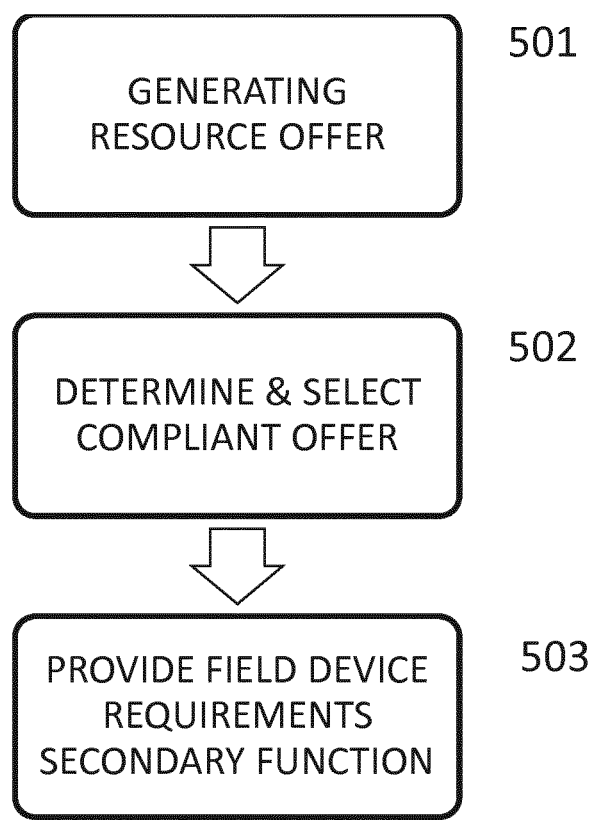
FIG. 8 illustrates an example of a method for resource load balancing in accordance with the invention.

Referring to FIG. 7, the steps of booting 102 each field device, evaluating 103 each field device, and initialising 104 each field device of the method as shown in FIG. 3 may further be complemented by resource load balancing 105. The resource load balancing 105, now referring to FIG. 8, includes generating 501 a resource offer as a secondary function of a field device, determining and selecting 502 a compliant resource offer, and providing 503 field device requirements for the secondary function.

The resource offer indicates the capability and/or capacity of a particular field device to execute a function or subroutine to support another field device. Hence, in addition to performing its primary function, the field device may also perform further functions or subroutines as secondary functions. Thereto, the identity container allows to assess which firmware modules and thus functions associated therewith are available, and what the respective cost of execution would be. These functions will then be executed by the field device that provided the resource offer. Accordingly, the primary function may be provided as a secondary function to another device or an additional i.e. auxiliary function of the field device may be provided as secondary function to another field device. Moreover, a primary function of a first field device may be based on a combination of multiple functions of firmware modules, each of which may be offered individually. Either way, in this manner the primary function of a second field device may be supported by a first field device.

The resource offer may be generated in response to a specific resource request, such as the resource request of a first field device, or it may be generated as default procedure i.e. automatically once the particular field device has been evaluated. In the latter case, the resource offer may be distributed by a broadcast message to other field devices or it may be directed to a control device that controls and coordinates the resource load balancing.

With one or more resource offers generated 501, determining and selecting 502 a compliant resource offer includes assessing which of the generated resource offers meet, or help to meet, the field device requirements provided for the primary function of the field device that generated the resource request. Based on the outcome of this assessment the compliant resource offer, field device requirements for the secondary function are provided.

The resource load balancing 105 described above allows to take advantage of firmware modules already available in the framework of one field device for supporting another field device requiring the same firmware module. A parameter particularly helpful for resource load balancing is the priority level, which may be assessed during evaluating the field device 103, as e.g. during determining 301 costs of execution. This allows to take in account real-time constraints for the firmware modules, as not all modules may run i.e. be executed with the highest priority. The resource load of firmware modules may also be taken in account for determining an optimal distribution over resources available for the loaded firmware modules. Knowing the individual loads of firmware modules, available processing unit CPU idle time may be calculated in which the field device may execute requested secondary functions. A maximum execution delay for each required primary and/or secondary function may also be considered for determining an optimal resource load balancing.

In addition to the above, the resource offer generated may be also indicate the capability and/or capacity of a particular field device to execute a function or subroutine not yet available in the framework. Hence, the resource offer may be based on both static and dynamic firmware modules already present in the framework. And it may also be based on dynamic firmware modules that may be added to the framework, after for example being downloaded from the control device or even from another field device. As firmware modules are stored in containers that may be exchanged through regular file transfer between different devices or between a network cloud and field devices.

Accordingly, to complement the resource load balancing 105, this may further include loading dynamic firmware modules to the framework required for the secondary function, configuring the framework according to the field device requirements for the secondary function, registering the dynamic firmware modules for the secondary function with the identity register, and updating the identity container.

Figure 9A:
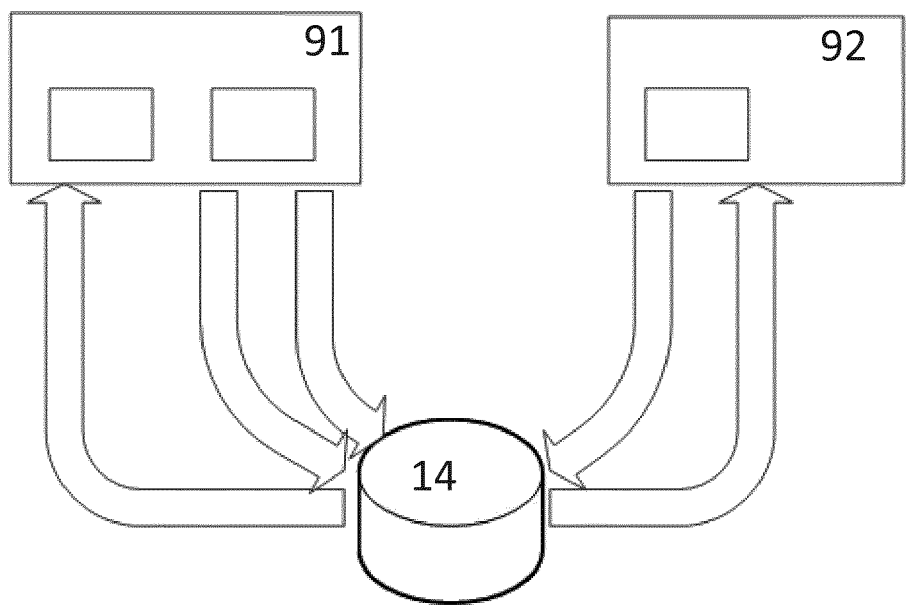
FIG. 9A schematically illustrates flow of data between field devices and a repository in accordance with the invention.
Figure 9B:
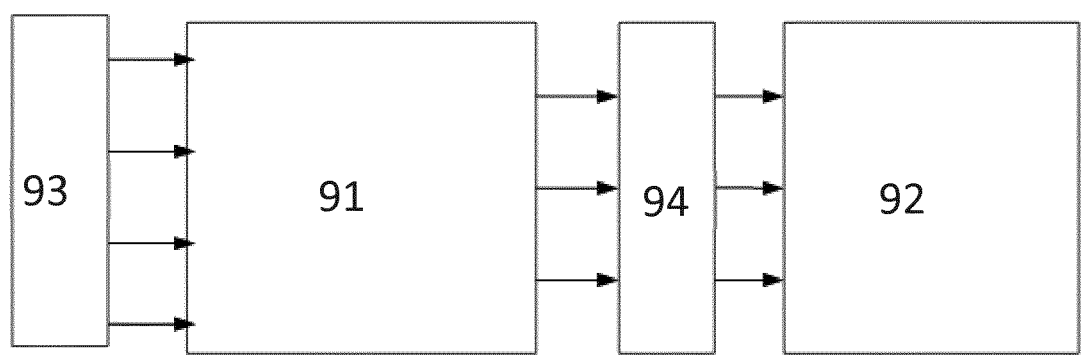
FIG. 9B schematically illustrates flow of data between field devices according to the state of the art.

The resource load balancing takes advantage of the functionality provided by the repository. FIG. 9A illustrates the manner in which data is exchanged via the repository 14. In contrast to prior machine applications, as shown in FIG. 9B, wherein firmware modules 91, 92 are hard coupled in a logical manner by data interfaces 93, 94 which puts constraints on the flow of data exchange: Data input for module 91 first moves through data interface 93 to module 91, then data output of module 91 moves through data interface 94 as data input to module 92. The use of the repository 14 allows a more flexible data exchange, as constraints and restrictions imposed by the data interfaces 93, 94 are circumvented. In this manner the firmware modules are decoupled from each other. In order to meet real-time constraints for the machine application, parameters and functions may be registered during the initialization phase to facilitate direct access to required data. In addition, access to the data may be synchronized to ensure that data is consistent when accessed simultaneously from different firmware modules.

The method for configuring a field device as disclosed may be performed in various programming environments and software languages, both procedural as object-oriented. In an object-oriented programming environment, a framework holds code that may be executed by a processing unit. The framework code may call upon additional pieces of code i.e. objects holding code, for performing its' function. A container may hold a number of objects, e.g. as a list, a que or a set of objects. Hence, the framework may also call upon a container as a particular type of object.

Figure 10:
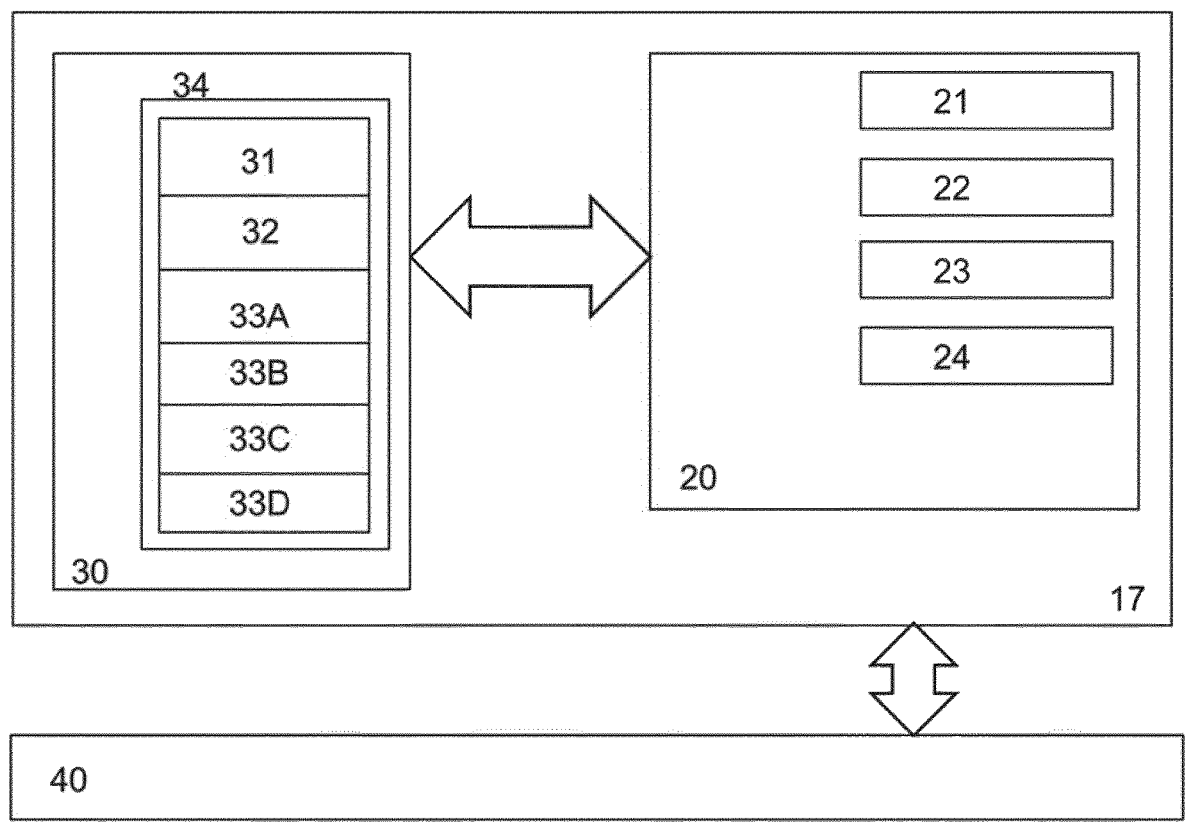
FIG. 10 schematically illustrates another example of a field device in accordance with the invention.

FIG. 10 schematically shows another example of a field device, having a processing unit 20, a memory unit 30, and a peripheral unit 40. The memory unit 30 stores various types of containers: an identity container 31, a repository container 32 and a number of independent firmware containers 33a, 33b, 33c and 33d. The containers 31-33D are part of a firmware framework 34. In this example, the part of the memory unit 30 storing the identity container constitutes the identity register as previously described.

The identity container 31 holds the identity of the device; e.g. what functionalities or functions the device can execute and how. The repository container 32 is a type of data base for storing and restoring device parameters, configurations and functions. The firmware containers 33a-d hold dynamic firmware modules which may be dynamically loaded when called upon by the framework 34. The dynamic firmware modules may be stored locally on the field device or remotely in e.g. a control device or another field device.

The processing unit 20 contains at least three program units that each contain a set of instructions: A Load-Unload Unit 21 for creating i.e. assembling the firmware framework 34. A Registration Unit 22 for creating the identity container 31. A Data Management Unit 23 for creating the repository container 32 for storing data, configuration, functions and parameters. In this embodiment, the processing unit 20 further contains an Optimization Unit 24 for providing resource load balancing. In another embodiment, instead of locally on the field device 20, the optimization Unit 24 may be executed remotely at a higher automation level, such as e.g. a control level, PLC or operation level, or by an engineering tool, or at a Cloud level.

The Load-Unload Unit 21 creates the firmware framework 34 for the primary function and the secondary function. The framework 34 provides a generic interface of the firmware modules 31-33D, that allows to load and/or unload firmware modules specific to the machine environment.

The Registration Unit 22 identifies the connected static and dynamic hardware components and associating respective firmware modules for the primary and secondary functions. The Registration Unit 22 outputs the identified components and associated firmware modules to the Identity Container 31. In this manner, the identity container 31 holds what functionalities the field device 17 may execute and what will be executed.

The Data Management Unit 23 manages the relationships between the internal and external data for the functions and available configurations in the field device 17. As shown above in FIG. 9A, the manner in which data is exchanged again runs via the repository container 32. The use of the repository container 32 managed by Data Management Unit 23 allows the more flexible data exchange. As constraints and restrictions imposed by the data interfaces are circumvented. Once more, the firmware modules are decoupled from each other. In order to meet real-time constraints for the machine application, parameters and functions may be registered during the initialization phase to facilitate direct access to required data. In addition, access to the data may be synchronized to ensure that data is consistent when accessed simultaneously from different firmware modules.

The Optimization Unit 24 checks at what level of performance the firmware modules to be loaded by the Load-Unload Unit 21 may be executed for primary and secondary functions. The performance may be checked taking in account scheduling, execution time, required memory resources, and need for synchronization with other firmware modules. The Optimization Unit 24 determines whether a function can be executed at the demanded performance level or that a request for support from another field device has to be sent in order to execute the demanded function. Furthermore, the Optimization Unit 24 may be configured to optimize the schedule of the loaded firmware modules in order to achieve an optimum performance. For optimization, criteria may be set by a machine operator in accordance with the machine environment; such criteria may include, for example, execution speed, memory usage, synchronization constraints.

A field device programmed as just described, may be particularly suited to perform the disclosed method in a straightforward manner.

In the method as disclosed herein, evaluating of each field device and resource load balancing are acts or phases that may be arranged for central or decentral i.e. distributed management. Hence, evaluating each field device may be performed by each respective field device and resource load balancing may be performed by the respective field devices. Or a control device may be provided for both evaluating each field device and resource load balancing. Alternatively, the field devices may be arranged for evaluating and the control device for resource load balancing, or the control device may be arranged for evaluating and the field devices for resource load balancing. Or even a mix thereof, wherein some of the field devices are arranged for evaluating and resource load balancing and control device is arranged to do so for the field devices not capable evaluating and resource load balancing.

Figure 11:
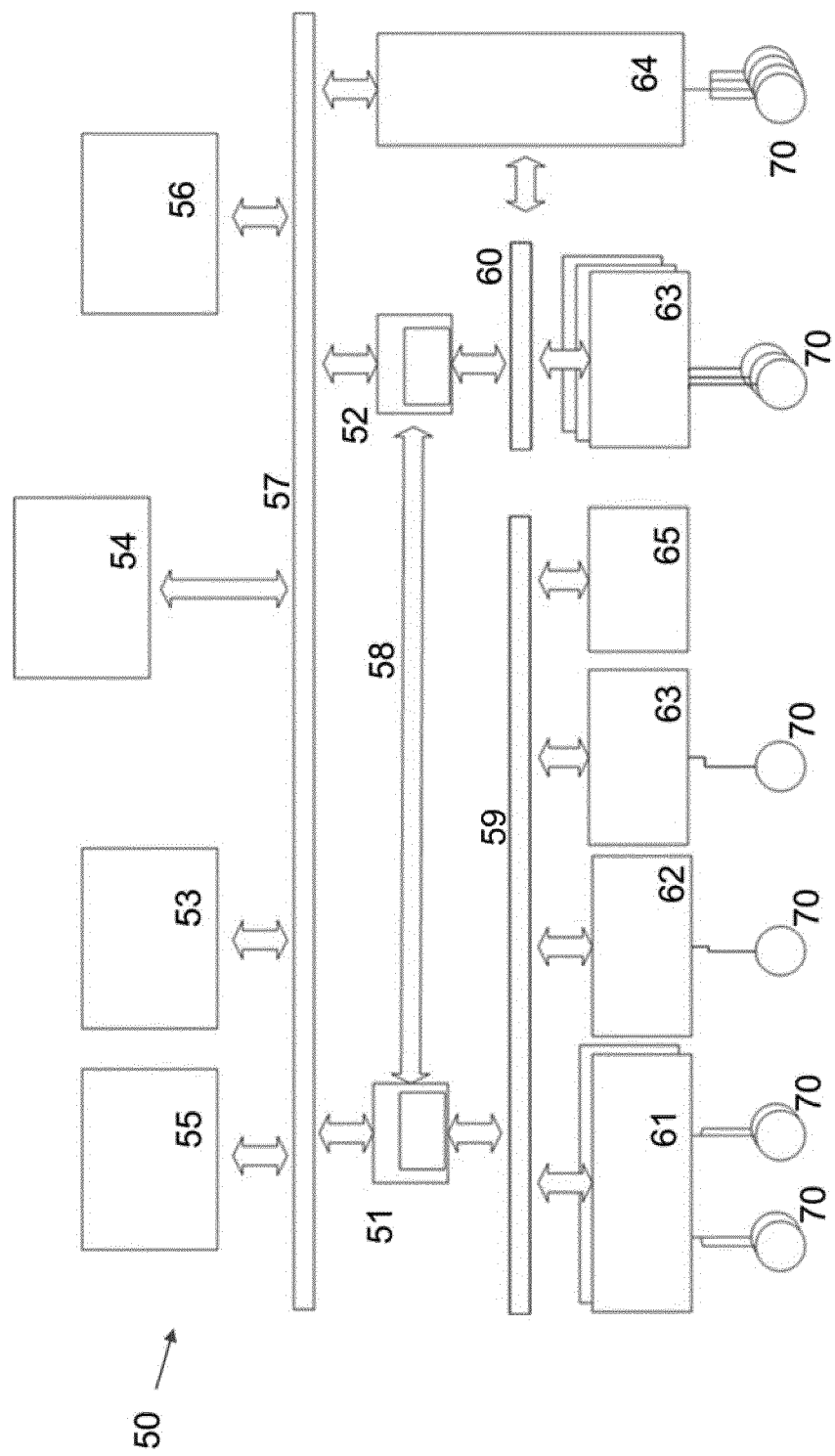
FIG. 11 schematically illustrates an example of an automation system in accordance with the invention.

A system capable of the methods disclosed herein is shown in FIG. 11. FIG. 11 schematically shows an automation system 50 having two PLC control devices 51, 52, a local cloud 53 and a remote cloud 54, engineering tool 55 and Human-machine Interface (HMI) tool 56. The automation system 50 further has a communication network made up from a commissioning/engineering Bus 57, a C2C Field Bus 58, and local Field Busses 59, 60. The automation system 50 employs different types of field devices 61-65 ranging from low performance till high performance, such as drives, I/O devices, sensors and actuators, for driving various motors 70. The control devices 51, 52 may be commanded via the engineering tool 55 that allows designing and generating a machine application. From the machine application, primary functions for each of the field devices are determined together with field device requirements for the respective field devices. The primary functions and associated field device requirements are transmitted to the respective field devices.

Figure 12:
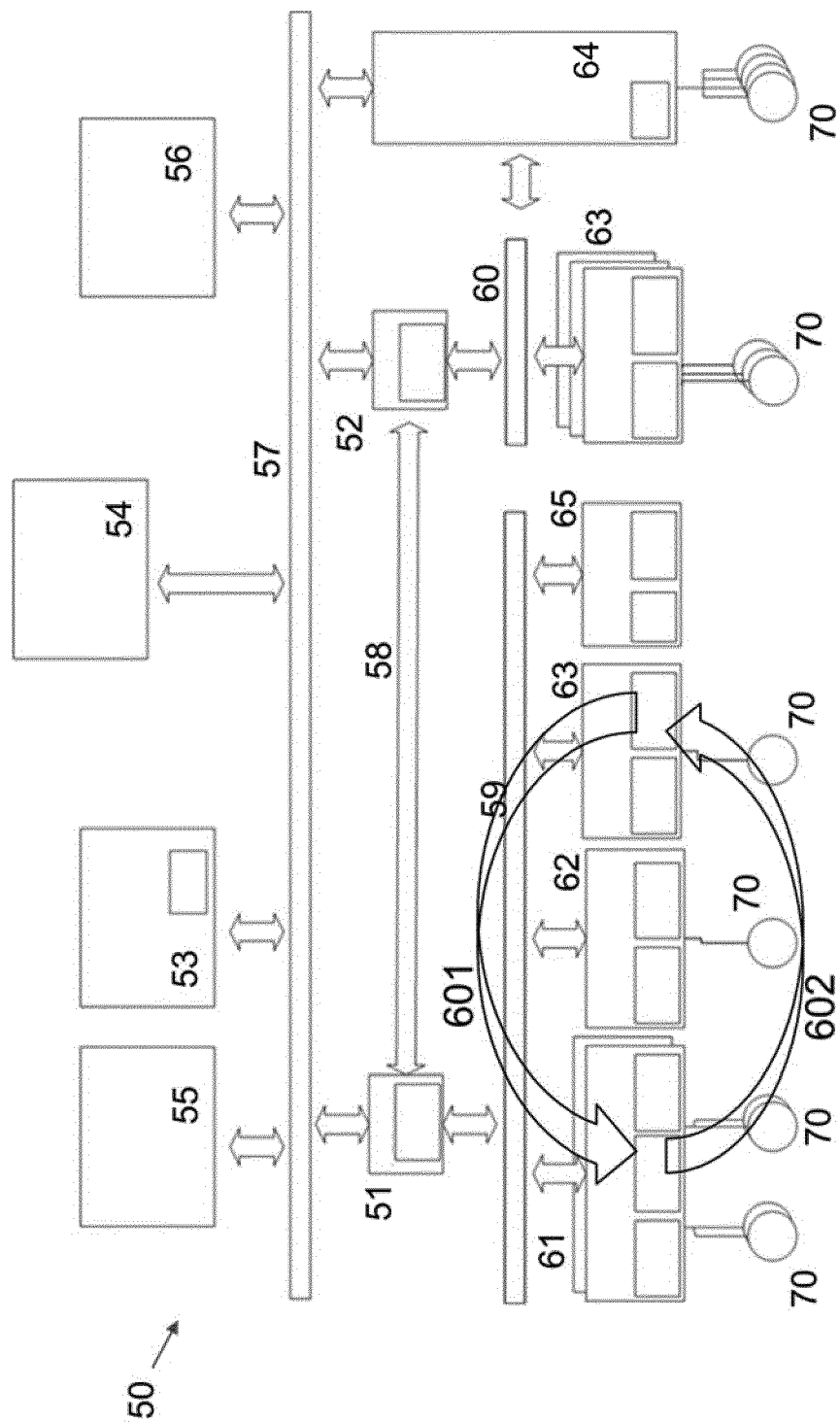
FIG. 12 shows the automation system of FIG. 11 configured according to the invention.

FIG. 12 exemplifies how functionalities of a low performance device may be executed on a field device with more resources. The device type 63 measures the real-time data locally, sends them 601 to the device of type 61 that can execute the required functionality and send back 602 the results to the device type 63. In this example, the network bandwidth and cycle time need to be sufficient to ensure that the real-time constraints of the device 63 are respected. If an operator would replace the device of type 63 with a more powerful device, the designed machine application would continue to run without modification. When replaced, the device 63 would have enough resources to execute the required functionality locally. Consequently, the identification container would be different and the device 61 no longer needs to provide the secondary functionality.

The method disclosed herein allows the system to perform an auto-configuration of the firmware framework as required for fulfilling a specific machine application. While minimising the user involvement as the user is only responsible for writing and designing the machine application. How the application will be executed and on or by which devices, is not of concern to the user. As the field device framework is composed only of the required firmware modules and may be re-composed for a specific application, the same hardware may be used to realise a number of various applications. That implies a reduction in costs in comparison to a monolith firmware framework required to perform the same functionality.

The field device disclosed herein is capable of performing a self-assessment i.e. self-identification: a process through which it can assess and evaluate its' own capabilities resulting in a device identity. The device identity includes configuration data, functions and parameters of the field device, which all may be adapted over time. This is enabled through the framework which contains firmware modules that enable the supporting functionalities, the identity register managing the device identity, and the repository managing the configuration data functions and parameters of the field device.

Thus, the framework may include static firmware modules for: connecting the field device to a machine environment, receiving machine application requirements, determining dynamic firmware modules required for the machine application, determining cost of execution of each registered firmware module, loading dynamic firmware modules to the framework of the field device, configuring the static and dynamic firmware modules according to the machine application requirements, and registering the firmware modules with the identity register. And the identity register is in turn arranged for managing a device identity.

In addition to storing an identity container, which may be generated by the identity register, the repository may further be arranged for adding costs of execution to the identity container. Hence, the repository generating an identity container including the device identity and execution costs. The repository may provision data exchange between firmware modules of this enhanced identity container together with other stored data.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. A method for configuring field devices:
providing at least two field devices each comprising a repository accessible by firmware modules and other field devices and arranged for exchanging data between firmware modules and between field devices, an identity register for maintaining a description of the field device, and a framework comprising static firmware modules and arranged for comprising dynamic firmware modules;
booting each field device from the static firmware modules, evaluating each field device for assessing additional dynamic firmware modules required; and initialising each field device for the static and dynamic firmware modules.

2. The method according to claim 1, wherein the booting comprises, for each field device:

generating an identity container;

connecting to a machine environment;

providing at least one predetermined primary function to the field device;

providing field device requirements for the at least one primary function.

3. The method according to claim 1, wherein the evaluating comprises:

determining cost of execution of the at least one primary function of the field device;

assessing whether the cost of execution complies with the field device requirements for the at least one primary function of the field device;

generating a resource request if the costs of the at least one primary function do not comply with the field device requirements.

4. The method according to claim 1, wherein the initialising comprises:

loading dynamic firmware modules to the framework required for the at least one primary function;

configuring the framework according to the field device requirements;

registering the dynamic firmware modules with the identity register; and updating the identity container.

5. The method according to claim 1, further comprising:

resource load balancing, which comprises:

generating a resource offer as a secondary function of a field device;

determining and selecting a compliant resource offer; and providing field device requirements for the secondary function.

6. The method according to claim 5, wherein resource load balancing further comprises:

loading dynamic firmware modules to the framework required for the secondary function;

configuring the framework according to the field device requirements for the secondary function;

registering the dynamic firmware modules for the secondary function with the identity register updating the identity container.

7. The method according to claim 5, wherein:

generating a resource offer is in response to the resource request of a first field device.

8. The method according to claim 5, wherein evaluating each field device is performed by each respective field device;

wherein resource load balancing is performed by the respective field devices; and wherein initialising is performed prior to evaluating.

9. The method according to claim 5, further comprising:

providing a control device;

wherein evaluating each field device is performed by the control device; and wherein resource load balancing is performed by the control device.

10. The method according to claim 3, wherein determining cost of execution comprises assessment of one or more of the parameters: cycle time, priority level, maximal delay, module load, resource load.

11. A method for configuring an automation system:

providing an automation system comprising a control device, a communication network and at least two field devices, each field device comprising a framework comprising static firmware modules and arranged for comprising dynamic firmware modules; an identity register for maintaining a description of the field device and a repository accessible by firmware modules and other field devices and arranged for exchanging data between firmware modules and between field devices;

generating machine application requirements;

evaluating the at least two field devices;

initialising the at least two field devices;

resource load balancing the automation system.

12. A field device comprising:

a framework comprising static firmware modules and arranged for comprising dynamic firmware modules;

an identity register for maintaining a description of the field device; and a repository accessible by firmware modules and other field devices and arranged for exchanging data between firmware modules and between field devices.

13. The field device according to claim 12, wherein the framework comprises static firmware modules for:

connecting the field device to a machine environment;

receiving machine application requirements;

determining dynamic firmware modules required for the machine application;

determining cost of execution of each registered firmware module;

loading dynamic firmware modules to the framework of the field device;

configuring the static and dynamic firmware modules according to the machine application requirements;

registering the firmware modules with the identity register;

wherein the identity register is arranged for:

managing a device identity;

wherein the repository is arranged for:

managing configuration data, functions and parameters of the field device;

generating an identity container comprising the device identity and execution costs;

provisioning data exchange between firmware modules.

14. An automation system comprising:

at least one control device;

at least one communication network; and at least two field devices according to claim 12.

15. The automation system according to claim 14, wherein the control device and field devices are arranged for performing:

booting each field device from the static firmware modules, evaluating each field device for assessing additional dynamic firmware modules required; and initialising each field device for the static and dynamic firmware modules.

* * * * *